Aug. 25, 1936.  J. W. LOGAN, JR  2,052,202
ELECTROPNEUMATIC BRAKE
Filed Jan. 19, 1934  4 Sheets-Sheet 1
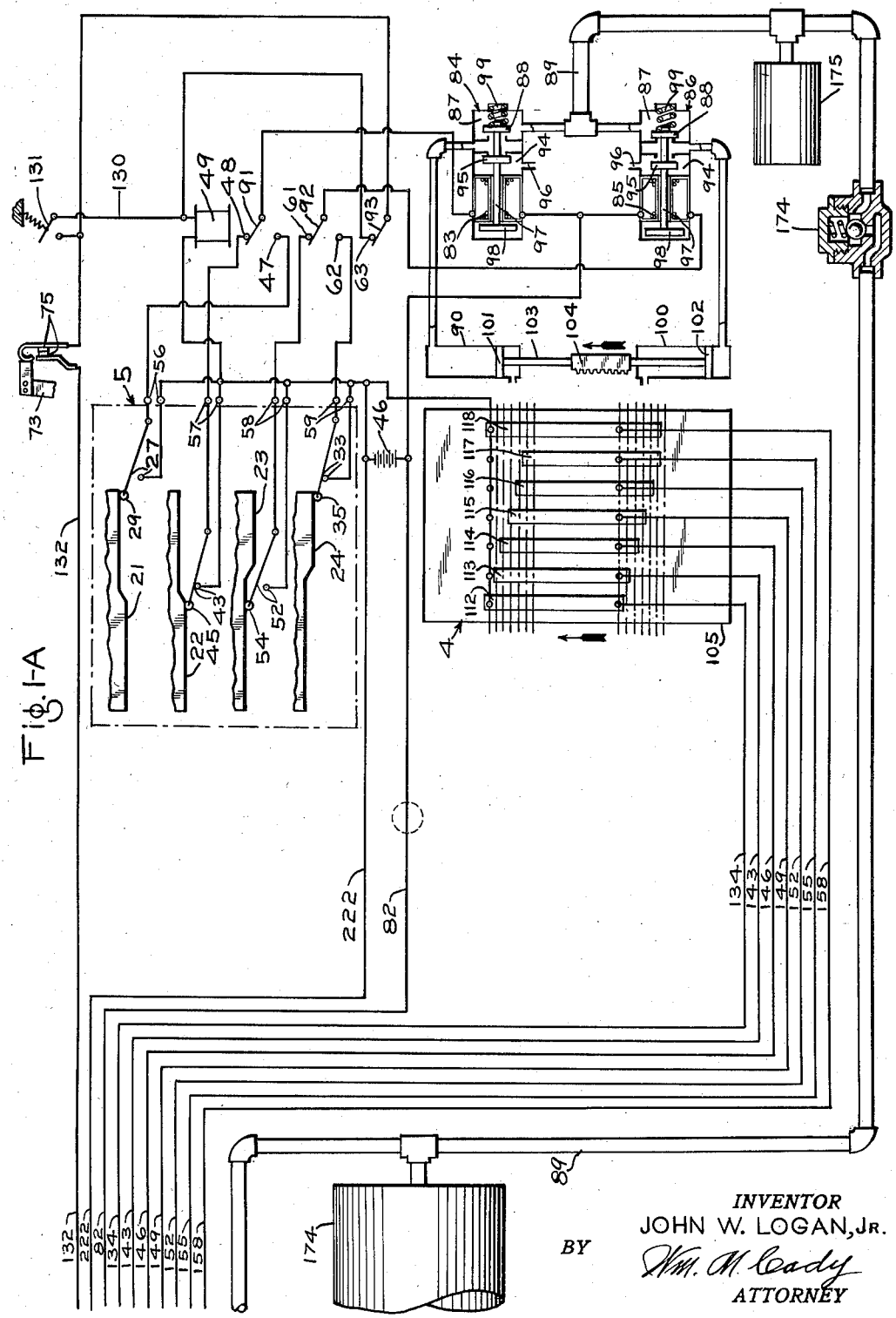
INVENTOR
JOHN W. LOGAN, JR.
BY
Wm. M. Cady
ATTORNEY

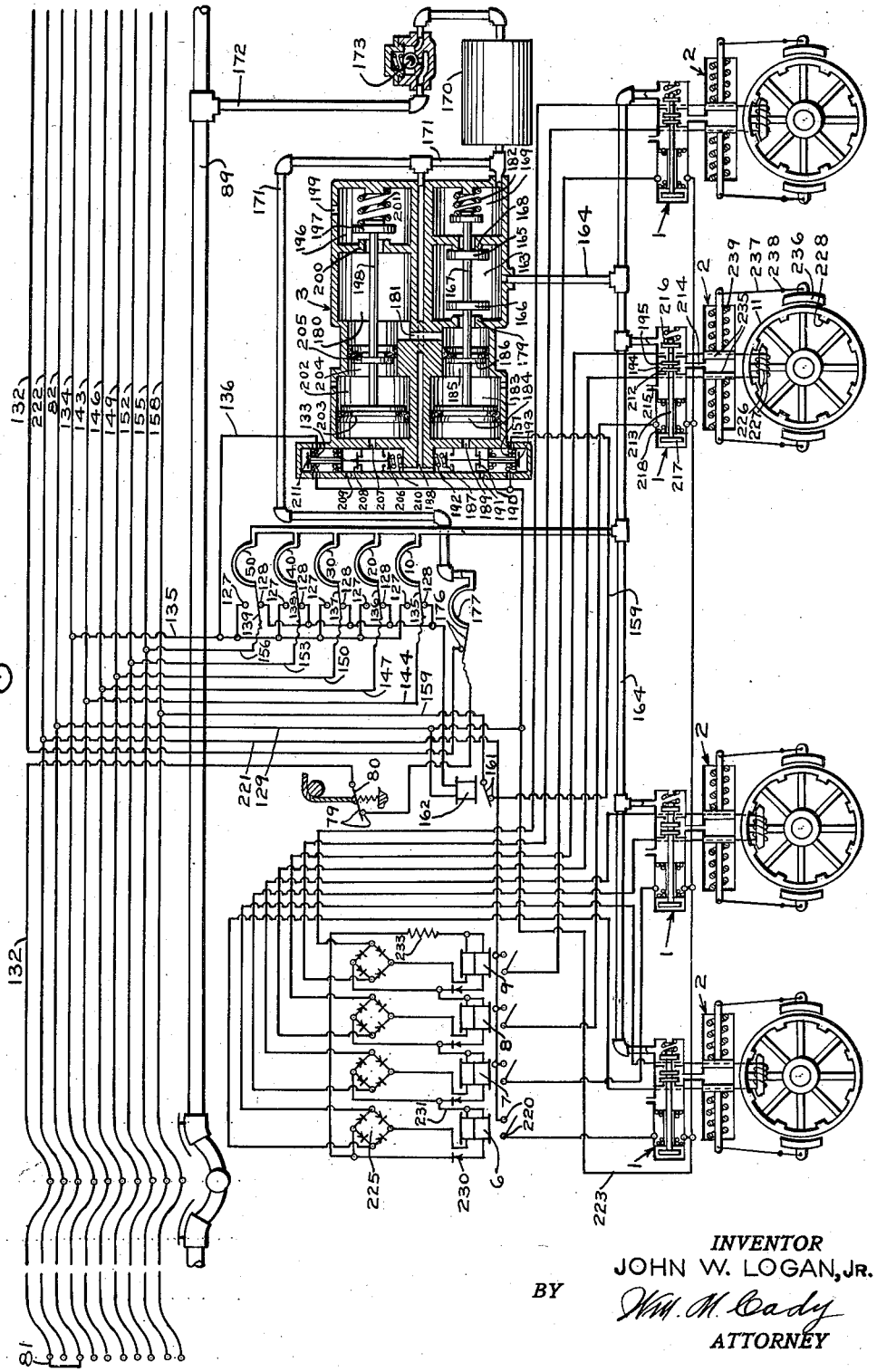

Aug. 25, 1936.　　　J. W. LOGAN, JR　　　2,052,202
ELECTROPNEUMATIC BRAKE
Filed Jan. 19, 1934　　　4 Sheets-Sheet 3
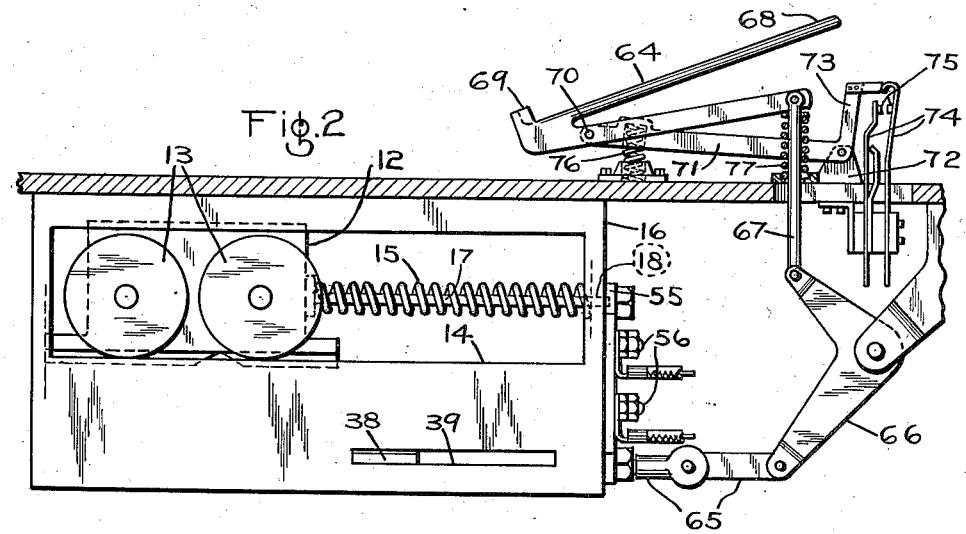
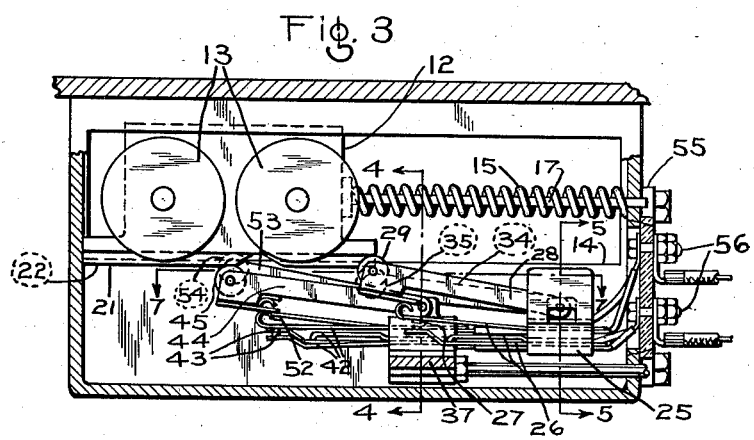
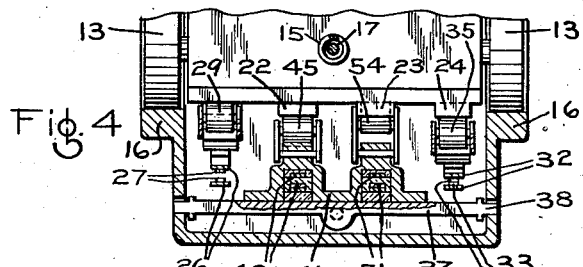
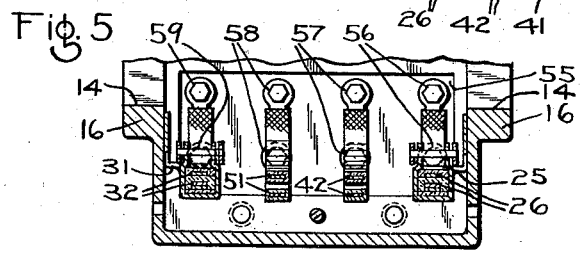
INVENTOR
JOHN W. LOGAN, JR.
BY Wm. M. Cady
ATTORNEY Aug. 25, 1936.  J. W. LOGAN, JR  2,052,202
ELECTROPNEUMATIC BRAKE
Filed Jan. 19, 1934  4 Sheets-Sheet 4
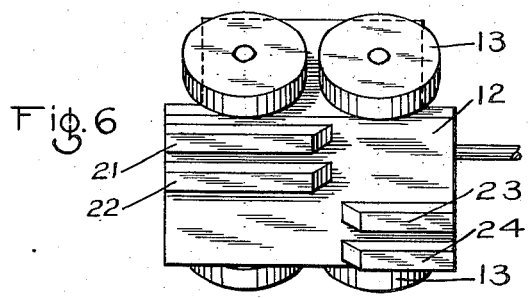
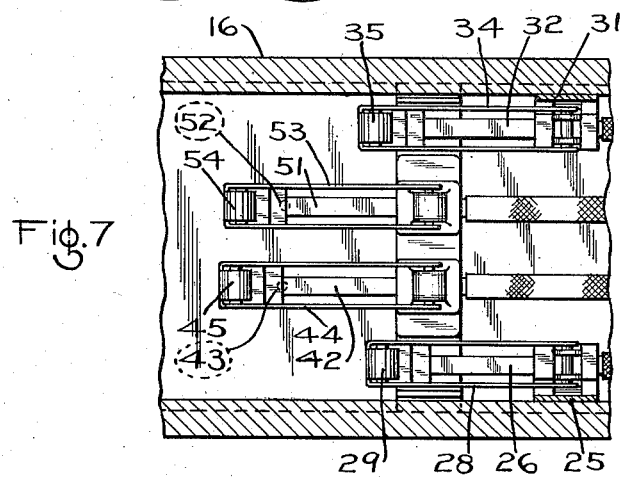
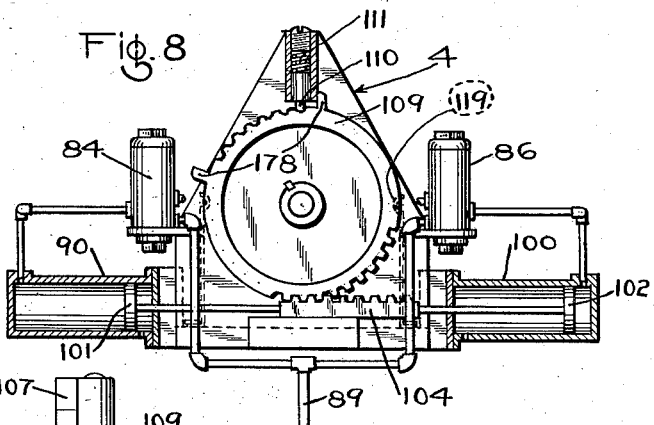
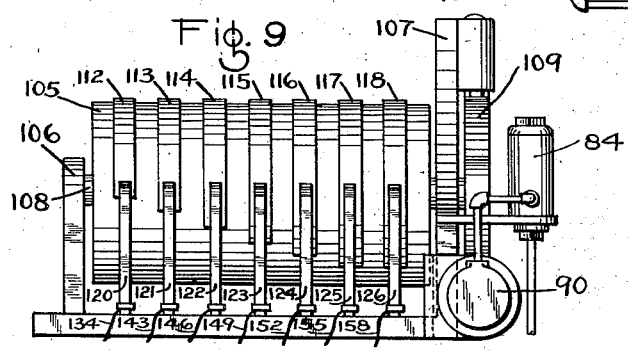
INVENTOR
JOHN W. LOGAN, JR.
BY
ATTORNEY Patented Aug. 25, 1936

2,052,202

UNITED STATES PATENT OFFICE 2,052,202

ELECTROPNEUMATIC BRAKE

John W. Logan, Jr., Wilkinsburg, Pa., assignor to The Westinghouse Air Brake Company, Wilmerding, Pa., a corporation of Pennsylvania Application January 19, 1934, Serial No. 707,282

43 Claims. (Cl. 303—24)

This invention relates to electro-pneumatic brakes, and more particularly to electro-pneumatic brake equipment for controlling the brakes on railway trains.

In applying the brakes on railway trains comprising multiple units, it is desirable that the brakes on each unit be applied in a manner such that each unit is decelerated at approximately the same rate. In practice, however, with the heretofore commonly employed brake systems having a triple valve operating in response to brake pipe reductions, this is difficult to obtain, due to the fact that there are always some differences in piston travel, leakage, slack in brake rigging, and for other reasons. These differences cause different pressures to be established in the brake cylinders on different cars, so that some cars will tend to decelerate at a rate greater than other cars. If the degree of application of the brakes on each car in the train could be controlled so that all cars tend to decelerate at the same rate, then such differences as those aforementioned would be of minor importance. When all cars tend to decelerate at the same rate a smoother stop results, and the danger of producing severe shock throughout the train, as well as sliding of the wheels, is greatly minimized. In carrying out my invention, I propose to provide an electro-pneumatic brake equipment in which provision is made for selecting different rates of retardation and for effecting and maintaining these rates on each unit in the train, so that the entire train may be retarded uniformly and brought to a stop smoothly and without shock. I further propose to provide an equipment which may be remotely controlled from the operator's cab, by the manual manipulation of a single control element, which is employed as a master controller for the braking throughout the entire train.

In the heretofore commonly employed brake systems for railway trains, the operator must do considerable manipulating back and forth of the handle of the brake valve on the locomotive at the head end of the train in order to make a smooth stop free of shock and wheel sliding. The operator must therefore possess considerable skill in the handling of different types of trains under different kinds of track conditions. It would be particularly desirable, therefore, if the operator could control the braking of the train by selecting a desired rate of retardation, and if the rate selected could be in accordance with the degree of movement of a single manually controlled element, so that by the simple movement of this element to a given position the train would be decelerated at a rate accordingly, and thereby be brought smoothly to a stop.

It is, therefore, a principal object of my invention to provide an electro-pneumatic brake equipment in which the brakes on each car in the railway train are at all times under the control of the operator in such a manner that the operator may select a desired practical rate of retardation, and this rate automatically maintained on each car in the train.

Another object of my invention is to provide an electro-pneumatic brake equipment in which desired brake cylinder pressures are attained, and maintained for all reasonable conditions of leakage and piston travel.

Another object is to provide an electro-pneumatic brake equipment in which the brakes on any given axle, or wheels of a given axle, are automatically released in case the wheels begin to slide.

Yet another object is to provide an electro-pneumatic brake equipment in which the brakes are normally applied without a reduction of pressure in the brake pipe, but which are automatically applied in case of accidental reduction in the pressure supply available for operating the brakes, whether due to leakage or other accidental causes.

A still further object is to provide an equipment of this type for controlling fluid pressure brakes, in which a retardation controller device functions as the master controller, and in which the selection of a desired rate of retardation by operation of the retardation controller device effects an initial application of the brakes with fluid supplied thereto at a maximum rate, which thereafter is automatically regulated in accordance with the preselected rate of retardation.

Other objects and advantages will be apparent from the following description of my invention, which I have illustrated in the attached drawings. In these drawings I have shown one embodiment of my invention in which, Figs. 1—A and 1—B, taken together, show in schematic form an arrangement of apparatus comprising this embodiment.

Fig. 2 is a view in elevation of a retardation controller device used in this embodyment.

Fig. 3 is a view of the retardation controller device shown in Fig. 2, with one side cut away to show more clearly the interior parts.

Fig. 4 is a view along the line 4—4 of Fig. 3.
Fig. 5 is a view along the line 5—5 of Fig. 3.
Fig. 6 is a partial perspective view of the under side of the inertia operated body associated with the retardation controller device.
Fig. 7 is a view along the line 7—7 of Fig. 3.
Fig. 8 is a vertical end view of a drum type controller used in this embodiment.
Fig. 9 is a vertical side view of this drum controller.

Referring now to the drawings, Figs. 1—A and 1—B, taken together, show a complete equipment for the head end car, while the equipment shown only in Fig. 1—B is duplicated on other cars in the train. The two figures, therefore, show the equipment for the entire train.

For the equipment on the head end car, I have shown magnet valve devices 1 for controlling the supply of fluid under pressure to and its release from individual brake cylinders 2, a brake valve device 3 for controlling the supply of fluid under pressure to and its release from all the brakes on one car, a drum type controller device 4 for controlling the brake valve devices 3 on all cars, and a retardation controller device 5 for controlling the drum type controller 4. For controlling the magnet valve devices 1, I have provided on each car a plurality of relays 6 to 9 inclusive.

In order to simplify the description of my invention, I have in Fig. 1—B shown four magnet valve devices 1 and four brake cylinders 2, associated with four brake drums 11, all of which for purposes of illustration may be taken as being associated with four axles on each car. It will be apparent, however, as my invention is more fully disclosed, that equipment may be provided for any other number of car axles.

Considering first now the retardation controller device 5, which functions also as a master controller or brake valve, I have provided an inertia operated body 12 equipped with wheels 13 adapted to roll in a trackway 14 in a housing or casing 16. The inertia operated body 12 is normally urged to a biased position by a spring 15, which is concentrically disposed on a rod 17 having one end secured to the body 12 and the other end slidably disposed in a bore 18 in the housing 16. When the body is acted upon by force of inertia, it moves from a biased position at the left to various positions to the right against resistance of the spring 15, depending on the rate of retardation of the vehicle.

Projecting downwardly from beneath the inertia operated body 12 are cams 21, 22, 23 and 24. These cams are adapted to actuate contact groups as will now be described.

Secured to one side of the housing 16, as by a bracket 25, are spring elements 26 carrying contacts 27. The contacts 27 are urged to an open position by the spring elements 26. Also supported by the bracket 25 and for operating contacts 27, there is provided an arm 28 having a roller 29 secured in one end thereof and adapted to engage the cam 21 for certain positions of the inertia operated body 12. When roller 29 is out of engagement with the cam 21 contacts 27 are open, and when roller 29 is in engagement with cam 21, contacts 27 are closed.

Secured to an opposite side of the housing 16, as by a bracket 31, is another group of spring elements 32 carrying contacts 33. The spring elements 32 are adapted to urge the contacts 33 to an open position. Also carried by the bracket 31 for operating the contacts 33, is an arm 34 having a roller 35 secured in one end thereof adapted to engage the cam 24 on the under side of the body 12. When the roller 35 is out of engagement with the cam 24 contacts 33 are open, but when the roller 35 is in engagement with the cam 24 contacts 33 are closed.

For the purpose of providing for different rates of retardation, there is supplied a slide member 37 having tongues 38 projecting into slots 39 in the housing 16. The slide 37 is thus adapted to move back and forth longitudinally of the housing 16, to position certain contacts with respect to the body 12 as will appear presently.

Mounted on the slide member 37 is a bracket 41. Supported by the bracket 41 are spring elements 42 carrying contacts 43. The spring elements 42 normally urge contacts 43 to an open position. For operating contacts 43, there is provided an arm 44 having one end thereof pivotally secured to the bracket 41, and in the other end thereof having secured a roller 45, which is adapted to engage the cam 22 on the under side of the body 12. When the roller 45 is out of engagement with the cam 22 the contacts 43 are open, but when the roller 45 is in engagement with the cam 22 the contacts 43 are closed.

Also supported by the bracket 41 is another group of spring elements 51 carrying contacts 52. The spring elements are adapted to urge the contacts 52 to an open position. For operating the contacts 52 there is provided an arm 53, having one end pivotally secured to the bracket 41 and having secured in the other end thereof a roller 54 adapted to engage the cam 23 on the under side of the body 12. When the roller 54 is out of engagement with the cam 23 contacts 52 are open, but when the roller is in engagement with the cam contacts 52 are closed.

For providing connection between external circuits and the heretofore described contacts, there is supplied a terminal board 55 secured to one end of the casing 16, and having disposed thereon a plurality of pairs of terminals 56 to 59 inclusive. The spring elements carrying the contacts 27, 33, 43, and 52 are so insulated and connected to the terminals of the terminal board 55 that contacts 27 open and close a circuit connected to terminals 56, contacts 43 open and close a circuit connected to terminals 57, contacts 52 open and close a circuit connected to terminals 58, and contacts 33 open and close a circuit connected to terminals 59.

For moving the slide member 37 back and forth, there is provided a foot pedal device comprising a foot pedal 64 connected to the slide member 37 through forks 65, a bell crank lever 66, and a rod 67. The foot pedal 64 is shaped to have a toe portion 68 and a heel portion 69, and is pivotally secured at 70 to the end of a lever 71, which has its other end pivotally secured to a bracket 72. The lever 71 has an extension 73 adapted to engage one of a plurality of spring elements 74 carrying contacts 75, to open the contacts.

The lever 71 is urged upwardly by a spring 76, so that the extension 73 holds contacts 75 open, but when pressure is applied to the heel portion 69 of the foot pedal 64, the lever 71 is depressed against resistance of the spring 76 to permit contacts 75 to be closed by the spring elements 74. Another spring 77, concentrically disposed on the rod 67, urges the toe portion 68 of the foot pedal to its uppermost position. Thus as pressure is applied to the heel portion 69 of the foot pedal, contacts 75 are closed, and as pressure is applied to the toe portion 68 of the foot pedal, the slide member 37, and hence contacts 75

43 and 52 carried thereby, are moved to the right. The purpose of this will more fully appear presently.

One of each of the pairs of terminals 56, 57, 58 and 59 is connected to a source of current supply, such for example as a battery 46, while the other of the terminals 56 and 57 are connected to contacts 47 and 48, respectively, of a selective relay 49, and the other of terminals 58 and 59 are connected to contacts 61 and 62, respectively, of the same relay. The selective relay 49 is also provided with a holding contact 63, and movable contact arms 91, 92 and 93.

The relay 49 has one terminal of its operating coil connected to one side of the battery 46 and the other terminal connected to the other side of the battery through conductor 130, reset push button switch 131, the already described contacts 75 of the foot pedal mechanism, conductor 132, which runs lengthwise of the vehicle, contacts 176 associated with a Bourdon tube 177, contacts 79 of a conductor's switch 80, a jumper 81, and a conductor 82. When the reset push button 131 is depressed momentarily, the selective relay 49 is energized and held energized by engagement of contact arm 93 with holding contact 63, so long as contacts 75, 176 and 79 are held closed.

The contact arm 91 of the relay is connected to a magnet winding 83 of a magnet valve device 84, while the contact arm 92 is connected to a similar magnet winding 85 of a similar magnet valve device 86. The other terminals of these two magnet windings are connected to the other side of the battery 46.

The magnet valve devices 84 and 86 are of similar design and each comprises a casing having a valve chamber 87 in which is disposed a supply valve 88 adapted to control the supply of fluid under pressure from a pipe 89 to cylinders 90 and 100. The casing of each is also provided with a release valve chamber 94 containing a release valve 95 adapted to control the release of fluid pressure from the cylinders 90 and 100 to the atmosphere by way of port 96. The valves 88 and 95 are secured to a valve stem 97 which has also secured to one end thereof an armature 98 adapted to be attracted toward the winding 83 in the device 84 or the winding 85 in the device 86, when either is energized, to seat the release valve 95 and unseat the supply valve 88, against resistance of a spring 99, which urges the supply valve toward seated position and the release valve toward unseated position.

The cylinders 90 and 100 contain pistons 101 and 102, respectively, connected by a rod 103, on which is secured a rack 104, for operating a drum 105 of the drum type controller device 4, as will be presently described.

The pipe 89 has connected therein a ball check valve 154 and thereto an auxiliary reservoir 175, so that fluid pressure will be available to operate the drum controlled device 4 in case of loss of pressure in the main reservoir to which pipe 89 is connected.

The retardation controller device 5, therefore, serves to control movement of the drum 105 by controlling movement of the rack 104 through the magnet valve devices 84 and 86. When the relay 49 is energized, the arms 91, 92 and 93 will be held in their uppermost position, and the contacts 43 and 52 of the retardation controller device will be effective in controlling rotation of the drum 105. When the relay 49 is deenergized, the contact arms 91, 92 and 93 will drop to their lowermost position, in which case contacts 27 and 33 of the retardation controller will be effective in controlling rotation of the drum 105. The reason for this will hereinafter more fully appear.

In the drum type controller device 4, the drum 105 is supported between two brackets 106 and 107 on a shaft 108, and the shaft 108 has secured to one end thereof a disc 109 having teeth adapted to mesh with the rack 104, so that lateral movement of the rack will impart rotary motion to the drum. Adjacent its topmost portion the disc 109 has notches formed therein cooperating with a plunger 110 to permit the drum to be rotated in steps. I have shown seven such notches, for providing for seven steps in the movement of the drum. The plunger 110 is normally urged downwardly into contact with the notches by a spring 111. Stops 178 are provided to limit the degree of rotational movement of the drum.

Secured to the periphery of and insulated from the drum 105 are a plurality of contacting strips 112 to 118 inclusive. On one side of the drum are a plurality of fingers 119, all of which are connected to one side of the battery 46. On the opposite side of the drum are a plurality of fingers 120 to 126 inclusive, adapted to contact with the contact strips 112 to 118 inclusive, respectively. The contact strips 112 to 117, inclusive, are so arranged that as the drum 105 is rotated the contact strips serve to connect the fingers 119 sequentially with the fingers 120 to 125 inclusive. The contact strip 118 is longer than the other strips and is adapted to hold contact between one of the fingers 119 and the finger 126 for all of the steps in the movement of the drum, except for that corresponding to the extreme clockwise position of the drum as viewed in Fig. 8, at which time none of the fingers 120 to 126 are in contact with the fingers 119.

In Fig. 1—A a developed view of the drum 105 has been diagrammatically shown. In this diagrammatic view the relative directions of movement of the drum 105 and the rack 104 are represented as being the same, as shown by the arrows. However, as may be seen from Figs. 8 and 9, the movement of the drum is opposite to that of the rack, but the diagrammatic representation in Fig. 1—A has been shown because it more clearly illustrates the operation of the device.

The brake valve device 3, whose operation is controlled by the drum controlled device 4, comprises a lower or supply valve section, and an upper or release valve section. The lower or supply valve section is provided with a valve chamber 163 having communication with the brake cylinders 2, through magnet valve devices 1, by pipe 164, and having disposed therein a supply valve 165 and a valve 166, both of which are secured to a valve stem 167. The supply valve 165 cooperates with a seat 168 to control the supply of fluid under pressure from a chamber 169 to the valve chamber 163, and hence to the brake cylinders through pipe 164. The chamber 169 is in constant communication with a local reservoir 170 by pipe 171. The local reservoir 170 is connected to a main reservoir 174 by pipes 172 and 89, through a ball check valve 173.

The valve 166 cooperates with a seat 179 to control the flow of fluid under pressure from the brake cylinders and pipe 164 to a chamber 180 in the upper or release valve section of the brake valve device, by way of passage 181, in a manner and for a purpose which will more fully hereinafter appear. A spring 182 urges the supply valve 165 to unseated position and the valve 166 to seated position.

The lower or supply valve section is also provided with a chamber 183 in which is disposed a piston 184 secured to the end of the valve stem 167. The piston 184 is adapted to actuate the valves 166 and 165 when fluid under pressure is supplied to one side thereof. There is also provided in the lower section a bore 185 with which is interfitted a piston 186, also secured to the stem 167, for providing a seal between chambers 163 and 183.

For contolling the supply of fluid under pressure to the chamber 183 to actuate the piston 184, there is provided a magnet valve device having a supply valve 187 adapted to control the supply of fluid to the chamber 183 from the local reservoir 170, by way of passage 188 and port 189. The magnet valve device also contains a release valve 190 adapted to control the release of fluid under pressure from the chamber 183 to the atmosphere, by way of port 191. The supply valve 187 is urged to seated position and the release valve 190 to unseated position by a spring 192. The valves 187 and 190 are secured to a valve stem which also has secured to one end thereof an armature 193 which is adapted to be attracted toward a winding 157, when energized, to unseat the supply valve 187 and seat the release valve 190.

The upper or release valve section of the brake valve device 3 is provided with a valve chamber 196 containing a release valve 197 secured to a valve stem 198. The valve chamber 196 is in constant communication with the atmosphere through a port 199. The release valve 197 cooperates with a seat 200 to control the release of fluid under pressure from the chamber 180, and hence from the brake cylinders and the chamber 163 of the supply valve section, to the atmosphere by way of the port 199. The release valve 197 is urged to seated position by a spring 201.

The upper or release valve section is also provided with a chamber 202 containing a piston 203 secured to the end of the valve stem 198, which is adapted to unseat the release valve 197 when fluid under pressure is supplied to the chamber 202 to one side of the piston 203. There is also provided a bore 204 having a piston 205 interfitting therewith and secured to the valve stem 198, for providing a seal between chambers 180 and 202.

For controlling the supply of fluid under pressure to the chamber 202 to operate the piston 203, there is provided a magnet valve device having a supply valve 206 adapted to control the supply of fluid under pressure from the local reservoir 170 to the chamber 202 by way of passage 188 and port 207. A release valve 208 is also provided in the magnet valve device for controlling the release of fluid under pressure from the chamber 202 to the atmosphere, by way of port 209. A spring 210 urges the supply valve 206 to seated position and the release valve 208 to unseated position.

Both valves 206 and 208 are secured to a valve stem having an armature 211 secured to one end thereof and adapted to be attracted toward a winding 133, when energized, to unseat the supply valve 206 and seat the release valve 208.

For controlling the brake valve device 3 to maintain desired brake cylinder pressures in accordance with the operation of the drum type controller 4, I have provided pressure operated relays in the form of Bourdon tubes 10, 20, 30, 40 and 50. These tubes, which are well known to those skilled in the art, are connected to the pipe 164 leading to the brake cylinders 2, and are therefore responsive to the pressures in the brake cylinders.

Each of these Bourdon tubes is provided with a movable contact, which remains in engagement with a lower stationary contact when the fluid pressure in the tube is below a certain value, but which moves toward engagement with an upper contact when the fluid pressure in the tube exceeds this certain value. For example, the Bourdon tube 10 may be designed to just move its movable contact out of engagement with its lower contact when the pressure in the tube reaches seven pounds per square inch, and to move into engagement with its upper contact when the pressure in the tube reaches thirteen pounds per square inch, so that the tube may be employed to effect a nominal or average ten pounds per square inch pressure in the brake cylinders.

In a like manner, the other tubes may be employed, in connection with operation of the drum controller device 4, as will hereinafter more fully appear, to effect other average brake cylinder pressures. For the purpose of illustration hereinafter, it will be assumed that each of the tubes 10, 20, 30, 40 and 50 is designed to effect an average brake cylinder pressure corresponding to the numeral designating it; i. e. tube 10 will be assumed to be employed to effect an average brake cylinder pressure of ten pounds per square inch, tube 20 a pressure of twenty pounds per square inch, tube 30 a pressure of thirty pounds per square inch, and so on.

Each of the Bourdon tubes has an upper contact, designated as 127, connected to the fingers 120 on the drum controller device 4, by conductors 134 and 135. These contacts are also connected to the winding 133 of the magnet valve device associated with the brake valve device 3, by conductor 136. The lower contacts of each of the Bourdon tubes, designated as 128, are connected to one terminal of the relay 162, which has its other terminal connected to the other side of the battery 46 by conductors 82 and 129.

The movable contact 135 of the Bourdon tube 10 is connected to the finger 121 of the drum controller device, by conductors 143 and 144. The movable contact 136 of Bourdon tube 20 is connected to the finger 122 of the drum controller device, by conductors 146 and 147. The movable contact 137 of the Bourdon tube 30 is connected to the finger 123 of the drum controller device by conductors 149 and 150. The movable contact 138 of the Bourdon tube 40 is connected to the finger 124 by conductors 152 and 153. The movable contact 139 of Bourdon tube 50 is connected to the finger 125, by conductors 155 and 156.

The finger 126 of the drum controller device is connected to the winding 157 of the magnet valve device associated with the brake valve device 3, through contacts 161 of the relay 162 and conductors 158 and 159.

Considering now the magnet valve devices 1, which are shown somewhat diagrammatically, each comprises a casing having a valve chamber 194, which is in constant communication with a duplex brake cylinder 2, and having disposed therein a supply valve 195 and a release valve 212, both of which are secured to a valve stem 213. The supply valve 195 is adapted to control the supply of fluid under pressure from the pipe 164 to the brake cylinder 2 through a passage 214, and the release valve 212 is adapted to control the release of fluid under pressure from the brake cylinder 2 to the atmosphere, by way of port 215.

The release valve 212 is urged to a seated position and the supply valve 195 to an unseated position by a spring 216. Secured to one end of the valve stem 213 is an armature 217 adapted to be attracted toward a winding 218, when energized, to unseat the release valve 212 and to seat the supply valve 195.

Each of the magnet valve devices 1 has one terminal of its winding 218 connected to one side of the battery 46 through one set of contacts 220 associated with one of the relays 6 to 9 inclusive, and by conductors 221 and 222. The other terminal of each of the windings 218 is connected to the other side of the battery 46 by conductors 223, 129, and 82.

Each of the relays 6 to 9 inclusive, is provided with an upper coil and a lower coil, wound oppositely and connected in series across the terminals of one of a plurality of rectifier devices 225, each of which in turn is connected to a winding 226 associated with a permanent magnet member 227.

Each of the permanent magnet members 227 is disposed adjacent to one of the drums or rotors 11, on which are uniformly spaced projections 228 adapted to move past pole pieces of the adjacent magnet member 227 when the brake drum is rotating, so that a magnetic path of periodically varying reluctance is provided through the brake drum for the flux set up by the permanent magnet.

As each of the brake drums 11 rotates, the magnetic flux in each of the magnet members 227 is caused to vary, and as a result an electromotive force is generated in each of the windings 226. Because of the varying of the magnetic flux in the magnet members 227, the electromotive force generated in the windings 226 is of a pulsating or alternating character. This alternating electromotive force is rectified by the rectifier devices 225 connected to the windings, so that relatively unidirectional current flows to each of the relays 6 to 9 inclusive, connected to the rectifier devices.

In each of the conductors leading from the lower coil of each of the relays to the associated rectifier device 225, there is disposed a valvular device 230, which is adapted to permit the flow of current only in the direction indicated by the arrowhead. Also, the top coil of each relay is connected by a conductor 231 to the rectifier device associated with the adjacent relay, in the manner as shown, so that all of the top coils form a series circuit which also includes the rectifier devices 225 and a current limiting resistance 233. The lower coil of each relay is then in effect shunted across a series combination including an upper coil and a rectifier device.

When the brake drums 11 are all rotating at approximately the same speed, the electromotive force generated in each of the windings 226 will be substantially equal. The electromotive force impressed upon the terminals of each of the rectifier devices 225 will therefore be substantially equal, and the current flowing through the series combination of the top coils of the relays will cause each of these coils to be energized alike. In a similar manner, the current flowing through the bottom coils of each of the relays will be substantially the same. The windings of the top and bottom coils are so proportioned that for this condition the two coils neutralize each other and the relays are ineffective to close the contacts 220.

If now, however, one of the axles with which the brake drums 11 are associated should cease to rotate, due to sliding of the wheels, the electromotive force generated in the winding 226 associated with that axle would be diminished, with the result that the current supplied to the series circuit including the top coils of each of the relays would be diminished. If, for example, it is assumed that the wheels with which the brake drum 11 at the extreme left in Fig. 1—B is associated should begin to skid, then the current supplied to both the top and bottom coils of the relay 6 would be diminished. The current in the bottom coil is, however, diminished more than the current in the top coil, as the top coil receives current from all the windings 226, whereas the bottom coil receives current only from the one winding, due to action of the valvular device 230, so that the magnetic force of the top coil overbalances that of the lower coil and is effective in closing the contacts 220 of relay 6, thereby energizing the winding 218 of the connected magnet valve device 1. As will more fully hereinafter appear, the energization of the winding 218 of this magnet valve device will act to cut off the supply of fluid under pressure to the brake cylinder 2 associated with the sliding wheel or wheels, and thus release the brake associated therewith.

The brake cylinders 2 are shown as being of the duplex type, each brake cylinder containing two pistons 235 adapted to move in opposite directions when fluid under pressure is supplied to the brake cylinder, to actuate brake shoes 236 into frictional engagement with the brake drum 11 through levers 237 pivotally mounted at 238. The brake shoes 236 are held in release position by springs 239 when fluid pressure in the brake cylinders is released to the atmosphere.

While the brake cylinders and mechanism for actuating the brake shoes have been shown in rather diagrammatic and elementary form, it is to be understood that I contemplate using a type of mechanism such as is commonly employed for fluid pressure brake apparatus of this type.

The operation of the equipment shown for the head end car will now be described:

It will be assumed that the front end of the car is to the right as viewed in Figs. 1—A and 1—B, and that the direction of travel of the car is from left to right. When the vehicle is running, the selective relay 49 is normally maintained energized, energization thereof being initially effected by momentarily closing push button switch 131. The relay is maintained energized by the operator holding the heel portion 69 of the foot pedal 64 depressed, so that contacts 75 are closed, current then being supplied to the relay 49 through the circuit already described.

If the vehicle is traveling on a level trackway at a substantially constant rate of speed, the relative position of the parts will be as shown in Figs. 1—A and 1—B. It will be noted that the contacts 43 of the retardation controller device 5 are closed, whereby the winding 83 of the magnet valve device 84 is energized, thereby permitting fluid under pressure to flow to the cylinder 90 and thus positioning the drum 105, of the drum type controller device 4, in its extreme counterclockwise position. In this position the windings 133 and 157 of the brake valve device 3 are energized, whereupon the brake cylinders 2 are thus vented to the atmosphere, and the supply of fluid thereto cut off. The brakes are thereby held in release position.

When it is desired to effect an application of the brakes, the toe portion 68 of the foot pedal 64 is depressed an amount in accordance with the rate of retardation desired. Assuming, for the sake of illustration, that the operator depresses the toe portion the maximum amount, the slide member 37 of the retardation controller device will be moved to its extreme right hand position. As the slide member 37 moves to the right, the roller 45 moves off the high part of the cam 22, whereupon contacts 43 are opened. Opening of contacts 43 deenergizes the winding 83 of the magnet valve device 84, whereupon the spring 99 seats the supply valve 88 and unseats the release valve 95. Supply of fluid pressure to the cylinder 90 will, therefore, be cut off, and pressure in the cylinder released to the atmosphere through port 96.

Shortly after the opening of contacts 43, the roller 54 will roll onto the high part of the cam 23, whereupon contacts 52 are closed. Closing of contacts 52 energizes the winding 85 of the magnet valve device 86. The release valve 95 of this device will thus be seated, and the supply valve 88 will be unseated. Fluid under pressure will, therefore, flow from the pipe 89 to the cylinder 100. Fluid pressure in the cylinder 100 will act upon the piston 102 to move the rack 104 to the left, as viewed in Fig. 8, or upwardly, as viewed in Fig. 1—A.

It is to be here understood that the exhaust ports 96 of the magnet valve devices 84 and 86 are designed to release fluid pressure to the atmosphere slowly, so that when, for example, the cylinder 90 is vented to the atmosphere and fluid pressure is supplied to the cylinder 100, the release of fluid pressure from the cylinder 90 is at a rate such that the rack 104 is moved from the right to the left (as viewed in Fig. 8) at a relatively slow rate. The drum 105 is, therefore, rotated in a clockwise direction at a corresponding slow rate. The purpose of this will appear presently.

As the drum 105 is caused to rotate in a clockwise direction, the contact strip 112 thereon disconnects the finger 119 just previously connected with the finger 120, so that the winding 133 of the magnet valve device associated with the upper or release valve section of the brake valve device 3, is deenergized, thereby releasing fluid pressure from the chamber 202 to the atmosphere, and permitting spring 201 to seat release valve 197. Venting of the brake cylinders 2 to the atmosphere is thereby cut off.

At the same time the contact strip 112 on the drum 105 disengages from the finger 120, the contact strip 113 connects another of the fingers 119 to the finger 121, whereupon the relay 162 is energized from the battery 46 through a circuit including the contact strip 113, the finger 121, conductors 143 and 144, movable contact 135 and stationary contact 128 of Bourdon tube 10, the relay 162, and conductors 129 and 82.

Energization of the relay 162 opens contacts 161, which deenergizes the winding 157 of the magnet valve device associated with the lower or supply valve section of the brake valve device 3. The supply of fluid under pressure to the chamber 183 is cut off and fluid pressure in the chamber is released to the atmosphere, whereupon spring 182 unseats the supply valve 165 and seats the valve 166, so that fluid under pressure flows from the local reservoir 170 to the brake cylinders 2 past the unseated valve 165, through brake cylinder pipe 164, past the unseated valves 195 of the magnet valve devices 1, and through passages 214. As the pressure builds up in the brake cylinders the brake shoes 236 are caused to frictionally engage the brake drum 11 and thus retard the vehicle.

As the brake cylinder pressure builds up and a pressure of seven pounds per square inch is reached, Bourdon tube 10 will respond thereto and disengage its movable contact 135 from its stationary contact 128. If energization of relay 162 was not otherwise maintained, it would thereby be deenergized and contacts 161 would again be closed, whereupon the winding 157 would be energized and the supply of fluid under pressure to the brake cylinders would be cut off.

If the pressure in the brake cylinders rose to a value of thirteen pounds per square inch, Bourdon tube 10 would move its movable contact 135 into engagement with its upper stationary contact 127, whereupon winding 133 of the brake valve device 3 would be energized, and fluid pressure in the brake cylinder would be released to the atmosphere.

However, with the foot pedal 64 depressed the maximum amount, the rotation of the drum 105 will cause contact strip 114 thereon to connect another of the fingers 119 to the finger 122 while strip 113 is disengaging from finger 121, thereby either maintaining energization of or re-energizing the relay 162 through a circuit which includes the movable contact 136 and the lower stationary contact 128 of Bourdon tube 20. As the drum 105 continues to rotate, contact strip 115 will be brought into engagement with another of the fingers 119 while the strip 114 is disengaging from finger 122, so that the relay 162 will be maintained energized through movable contact 137 and stationary contact 28 of tube 30.

The speed at which the drum 105 rotates, therefore, controls the rate of rise of pressure in the brake cylinders, because if the pressure rises faster than the rotation of the drum sequentially connects the movable contacts of the Bourdon tubes in circuit to keep the relay 162 energized, then the Bourdon tubes act to deenergize the relay to cut off the supply of fluid. It will, therefore, be seen that the Bourdon tubes 10, 20, 30, 40 and 50 act to cut off the supply of fluid under pressure to the brake cylinders if the pressure therein rises too fast, and if necessary to release pressure from the brake cylinders.

With the toe portion 68 of the foot pedal depressed the maximum amount, the drum 105 will be rotated to its extreme clockwise position, or through the seven steps corresponding to the seven notches in the disc member 109.

Through the first six of these steps the fingers 119 are sequentially connected with the fingers 120 to 125 inclusive, while one of the fingers 119 is continuously connected to the finger 126, this latter connection serving to maintain energization of the winding 157 except as interrupted by energization of the relay 162 through the contacts of the Bourdon tubes.

As the drum 105 moves to the seventh position of its clockwise movement, the fingers 119 are entirely disconnected from any one of the fingers 120 to 126 inclusive, whereupon the circuit to the winding 157 is completely interrupted, and the fluid pressure in the brake cylinder will be permitted to build up the maximum amount.

As the vehicle decelerates, the inertia body 12 of the retardation controller device, moves to the right against opposition of the spring 15. The movement of the body 12 will depend upon the rate of retardation, and since in the case assumed the foot pedal is depressed the maximum amount, so that a maximum brake cylinder pressure is effected, the maximum rate of retardation will result. The body will, therefore, move through the maximum distance to the right.

The roller 54 will, therefore, roll off the high part of the cam 23 and thus open contacts 52 to deenergize the winding 85 of the magnet valve device 86. The supply of fluid under pressure to the cylinder 100 will be cut off and fluid pressure in the cylinder will be released to the atmosphere through exhaust port 96 of that valve device.

The drum 105 will not, however, be rotated by release of pressure from the cylinder 100 as the plunger 110 holds the drum at rest by engagement with a notch on the disc 109. However, as the body 12 of the retardation controller device moves to the right, roller 45 rolls onto the high part of cam 22, whereupon contacts 43 are again closed. Closing of contacts 43 energizes winding 83 of magnet valve device 84, thereby permitting fluid under pressure to be supplied to the cylinder 90. The drum 105 is, therefore, now rotated in a counter-clockwise direction.

As the drum 105 rotates in a counter-clockwise direction, contact strips 117 and 118 thereon will again bring two of the fingers 119 into connection with fingers 125 and 126, respectively. If now the brake cylinder pressure has built up to a value of fifty pounds per square inch, all of the movable contacts of the Bourdon tubes 10, 20, 30, 40 and 50 will have been moved out of engagement with their lower stationary contacts 128, so that the relay 162 is not now energized by the connection effected between one of the fingers 119 and the finger 125 and contacts 161 therefore remain closed. Current may, therefore, flow through the contact strip 118, and the circuit connected therewith as before described, to the winding 157, thereby effecting a cutting off of the supply of fluid under pressure to the brake cylinders.

If the brake cylinder pressure has reached a value in excess of fifty pounds per square inch, and sufficient to cause the movable contact 139 of Bourdon tube 50 to engage the upper stationary contacts 127 of the tube, then the winding 133 will be energized and thereby effect an unseating of the release valve 197, whereupon fluid pressure in the brake cylinder will be released to the atmosphere until it reaches a value of approximately fifty pounds per square inch. At or about this value Bourdon tube 50 will disengage its movable contact 139 from its upper stationary contacts 127, thereby deenergizing the winding 133 and thus effecting a seating of the release valve 197.

As the drum 105 moves further in a counter-clockwise direction, contact strip 116 thereon will connect another of the fingers 119 with the finger 124, thereby rendering the Bourdon tube 40 effective in regulating the brake cylinder pressure. As the drum continues to rotate in a counter-clockwise direction it will bring the other fingers 123, 122, 121, and 120 into connection with the fingers 119 to reduce the brake cylinder pressure to that corresponding to the Bourdon tubes whose movable contacts are successively connected to the battery 46 through the drum controller device 4.

If, however, it is desired to maintain a maximum rate of retardation, as originally assumed, the drum 105 will move, if at all, in a counter-clockwise direction through only such steps as are necessary to reduce the brake cylinder pressure to the point where the maximum rate of retardation is attained. Thereafter as the speed of the vehicle diminishes, and the rate of retardation increases due to the increase of coefficient of friction between the brake shoes and drums, the body 12 will move to the right a sufficient distance to cause further counter-clockwise movement of the drum 105, and thereby further reduce the brake cylinder pressure.

During deceleration, therefore, the body 12 will move back and forth to cause the necessary movement of the drum 105 to effect such reduction or increases in the brake cylinder pressure as are necessary to maintain the rate of retardation selected by depressing the toe portion of the foot pedal.

As the car approaches a stop, the operator may control the braking thereof by manipulation of the foot pedal in a manner similar to that used in manipulating the usual brake valve device. When the vehicle has been brought to a stop, it may be held at rest by depressing the toe portion of the foot pedal, as when applying the brakes during running.

If after selecting a given rate of retardation by depressing the toe portion of the foot pedal the desired amount, the operator should wish to select a different rate of retardation, he may do so by further depressing or releasing the foot pedal, depending upon whether an increased or a decreased rate of retardation is desired. In other words, he may manipulate the foot pedal in the same manner as now employed in manipulating the handle of the usual brake valve device.

When running, the operator maintains pressure on the heel portion 69 of the foot pedal, thereby maintaining contacts 75 closed. If for any reason the operator should release the pressure on the heel portion of the foot pedal, contacts 75 would be opened. Opening of contacts 75 would deenergize the selective relay 49, whereupon contact arms 91, 92 and 93 would drop to their lowermost position.

In this position, and with the retardation controller device in its extreme left hand position, contacts 33 would be closed, whereupon the winding 85 of the magnet valve device 86 would be energized, and fluid under pressure would flow to the cylinder 100. An application of the brakes would thereby be effected in the same manner as if the slide member 37 had been moved to its extreme right hand position by depressing the toe portion of the foot pedal the maximum amount.

Contacts 43 and 52, therefore, are no longer effective in controlling fluid supplied to the brake cylinders, but contacts 27 and 33, which, as heretofore described, are relatively stationary with respect to the contacts 43 and 52, now act to control the fluid supply to the brake cylinders, with the exception, however, that being relatively stationary they act to maintain a maximum rate of retardation.

Opening of contacts 75 is intended to take place only in an emergency, as should the operator become incapacitated to control the train. Contacts 27 and 33 are employed therefore in effecting an emergency application of the brakes.

This emergency feature of my invention may be also used to hold the vehicle at rest after it has been brought to a stop. When the vehicle is at rest the body 12 will, of course, be in its extreme left hand position, and as soon as contacts 75 are opened, as before described, the brakes will be applied with maximum braking force, which although greater than necessary to hold the vehicle at rest may be permissible under ordinary circumstances.

An emergency application of the brakes may be effected from other parts of the car by pulling a conductor's cord to operate the conductor's switch 80 and open contacts 79. Opening of contacts 79 will effect the same emergency operation of the brakes as opening of the contacts 75.

It will be seen, therefore, that with the arrangement of apparatus provided both a service and an emergency application of the brakes may be effected through the one retardation controller device and the apparatus connected thereto.

The retardation controller device may be designed so that the maximum rate of retardation provided for by it is that which can be maintained with the best possible track and running conditions, so that when effecting emergency applications of the brakes the car may be brought to a stop in the shortest possible time. The retardation controller device will, of course, provide for other rates of retardation, so that the operator will have a wide practical range from which to choose when braking the vehicle.

If during either a service or an emergency application of the brakes the wheels on any of the axles should begin to slide, the relay of the relay groups 6 to 9, inclusive, connected to the winding 226 associated with the sliding wheel will effect closing of its associated contacts 220, to energize the winding 218 of the magnet valve device controlling the supply of fluid pressure to the brake shoes of the sliding wheels, and thereby effect a seating of the supply valves 195 and unseating of the release valves 212. Fluid pressure to the brake cylinder will, therefore, be cut off and pressure in the brake cylinder will be released to the atmosphere.

As soon as sufficient pressure has been released from the brake cylinder, so that the wheels begin to rotate again, the electromotive force generated in the winding 226 will again increase and, as before described, the current in the top and bottom coils of the relays 6 to 9 will again balance and the closed contacts 220 will again open. Fluid under pressure will again be supplied to the brake cylinder, as before, and should the wheels again begin to slide, the operation just described will be repeated until the pressure has been reduced sufficiently to permit the wheels to roll in accordance with the speed of the car.

If, for any reason, the pressure in the local reservoir 170 should be reduced below a certain minimum point, the car should not be operated. The Bourdon tube 177, which is connected to the local reservoir 170 by the pipe 171, is designed to open contacts 176 when the pressure in the local reservoir falls below a certain chosen value, below which it is undesirable to operate the car. Opening of these contacts effects an emergency application of the brakes, in the same manner as described in connection with the opening of the contacts 75. Pressure in the local reservoir 170 is maintained by supply from the main reservoir 174 through pipes 89 and 172. The ball check valve 173 disposed in the pipe 172 serves to prevent back flow of pressure from the local reservoir 170 to the pipe 172. When an application of the brakes is made the pressure in the local reservoir 170 falls below that of the main reservoir 174, and the main reservoir, therefore, supplies the deficiency in pressure in the local reservoir by unseating the ball check valve 173.

If, for any reason, the supply in the main reservoir should be diminished and not restored to the normally maintained pressure, the pressure in the local reservoir would fall below its normal at the first application of the brakes. If the diminished pressure in the local reservoir is such as to cause opening of the contact 176, then the car could not again be started and warning would thereby be given to the operator that some fault has occurred. An investigation would, of course, reveal the trouble, and steps could be taken to remedy the fault. Having described the embodiment of my invention shown with respect to one car only, I now wish to point out wherein provisions are made for controlling an entire railway train. The embodiment of my invention shown may be adapted to both an articulated type and a non-articulated type of railway train.

Considering the non-articulated type, the apparatus shown in Fig. 1—B is duplicated on each of the other cars in the train, and the pipe 89 extends throughout the length of the train in the same manner as the well known brake pipe used in connection with the usual type of fluid pressure braking equipment.

The conductors 132, 222, 82, 134, 143, 146, 149, 152, 155 and 158 extend throughout the length of the train and provide for controlling the apparatus on each car of the train in the same manner as described in connection with the head end car. At the end of the train the jumper 81 must be provided for connecting the end of the conductor 132 with the end of the conductor 82, so as to preserve the continuity of the circuit established by these two conductors, for the purpose as heretofore described.

The embodiment shown may be adapted to an articulated type of train in the same manner as just described for a non-articulated type of train. However, since in the articulated type of train one truck serves for the adjacent ends of two cars, equipment need be provided only on every other car in the train. For example, in a train comprising five cars there will be six trucks. Car No. 1, which is the head end car, will have the full equipment as shown in Figs. 1—A and 1—B combined, while cars 3 and 5 will have such equipment as is shown in Fig. 1—B, and cars Nos. 2 and 4 will have no equipment as that on cars Nos. 1, 3 and 5 will control the brakes on all the trucks.

Of course, for either the articulated or non-articulated type of train, a master control may be provided at both the head end and rear end of the train, as the conductors which run the full length of the train are the same at the rear end as at the head end.

I wish to point out that while the drum controller device 4 renders corresponding Bourdon tubes on each car in the train effective in maintaining a definite brake cylinder pressure, this pressure need not be the same on each car in the train. The Bourdon tubes on each car may be manually adjustable to maintain different pressures, or if not adjustable then designed to produce pressures according to the conditions under which the car operates.

For example, if certain cars in a train are normally always heavily loaded while others are generally lightly loaded, obviously the brake cylinders on the former should have a greater pressure supplied thereto, so as to cause each car to decelerate at the same rate. The tubes on the heavily loaded cars may therefore be adjusted, or so designed if not adjustable, to produce higher pressures in the brake cylinders on the heavily loaded cars.

It will thus be seen that I have provided an electro-pneumatic brake equipment in which a retardation controller device is provided for selecting and maintaining different rates of retardation, and which also performs all the functions of the usual brake valve. The equipment also has provision for effectively maintaining definite brake cylinder pressures on each car throughout the train, which pressures are controlled by the retardation controller device, so that each car in the train is retarded in accordance with the operation of the retardation controller device. The equipment has further provision for emergency application of the brakes in case of incapacitation of the operator, or loss of fluid pressure supply. In addition to providing for full control of the train at the head or rear end thereof, I have also provided means for automatically releasing the brakes on individual pairs of wheels, should one or both of the wheels begin to slide, and for again applying the brakes when the wheel or wheels begin to roll.

While I have described one preferred embodiment which my invention may take, it is to be understood that many modifications and changes may be made and I do not, therefore, desire to be limited to the exact embodiment shown, but include also such other embodiments as are within the spirit and scope of the appended claims.

Having now described my invention, what I clam as new and desire to secure by Letters Patent, is:

1. In a railway train brake system, in combination, means for applying the brakes on each unit in the train, control circuits adapted to extend throughout the train, means associated with said circuits for controlling said first means, and means having manually operated elements for effecting energization of said circuits successively to progressively increase the degree of application of the brakes and also having elements controlled by the rate of retardation of the vehicle for subsequently controlling energization of said circuits.

2. In a railway train brake system, in combination, means for applying the brakes on each unit in the train, control circuits adapted to extend throughout the train, pressure operated relays associated with said circuits for controlling operation of said first means, a selective controller device for selectively energizing said circuits, means operated according to the rate of retardation of the vehicle, and means controlled by said last mentioned means for controlling operation of said selective controller device.

3. In a railway train braking equipment, the combination with a brake cylinder, of a brake valve device for controlling the supply of fluid under pressure to and its release from said brake cylinder, means for controlling the operation of said brake valve device, a retardation controller device having stationary and movable contact groups for controlling operation of said means, and means whereby said movable contacts are operable for service applications of the brakes and said stationary contacts are operable for emergency operation of the brakes.

4. In a railway train braking equipment, the combination with a brake cylinder, of a brake valve device for controlling the supply of fluid under pressure to and its release from said brake cylinder, means for controlling the operation of said brake valve device, a retardation controller device having stationary and movable contact groups for controlling operation of said means, and a selective relay adapted when energized to render one of said contact groups effective and the other of said groups ineffective in controlling said means.

5. In a railway train braking system, the combination with brake devices for each vehicle in the train, of electrically controlled means for effecting operation of said devices, control apparatus for controlling said means, electrical circuits interconnecting said means and said control apparatus, and means whereby opening of one of said circuits renders said control apparatus effective in producing an emergency application of the brakes.

6. In a railway train braking system, the combination with brake devices for each vehicle in the train, of electrically controlled means for effecting operation of said devices, control apparatus for controlling said means and providing for the selecting at will and maintaining of different rates of retardation, electrical circuits interconnecting said means and said control apparatus, and means whereby opening of one of said circuits causes said control apparatus to effect an application of the brakes for the maximum rate of retardation.

7. In a railway train brake system, the combination with brake cylinders for different units of the train, of a retardation controller device providing for the selection of different rates of retardation, means for selecting different brake cylinder pressures in accordance with the operation of said retardation controller device, and means for effecting a pressure in said brake cylinders as selected by said means and for preventing said pressure from substantially decreasing below that selected.

8. In a vehicle brake system, in combination, brake means, a first movable body, a second movable body adapted to be moved according to the rate of retardation of the vehicle, means providing for movement of both of said bodies in linear pathways, a control element for controlling applications of said brake means, means for moving said first body in accordance with the movement of said control element, contacts adapted to be engaged and disengaged by movement of said two bodies, and means controlled by said contacts for controlling said brake means.

9. In a vehicle brake system, in combination brake means, a first body slidably movable, a second body adapted to be rolled along a pathway, according to the rate of retardation of the vehicle, a control element for controlling applications of the brakes, means for moving said first body in accordance with the movement of said control element, contacts carried by one of said bodies and adapted to be operated upon relative movement between said two bodies, and means controlled by said contacts for controlling said brake means.

10. In a vehicle brake system, in combination, a brake cylinder, two bodies each of which is movable in a linear pathway, one of said bodies being moved according to the rate of retardation of the vehicle, a control element for controlling applications of the brake, means for moving the other of said bodies in accordance with the movement of said control element, means rendered operable upon movement of said last mentioned body to effect a supply of fluid under pressure to the brake cylinder and operable upon subsequent movement of said other body to effect cutting off the supply of fluid to said brake cylinder.

11. In a vehicle brake system, the combination with electroresponsive means for controlling applications and release of the brakes, of a member movable by manual operation, a member movable in a linear pathway toward and away from said first member according to the rate of retardation of the vehicle, means rendered operable upon movement of said manually operated member for effecting operation of said electroresponsive means to produce an application of the brakes, and means rendered operable upon a movement of said inertia operated member for effecting operation of said electroresponsive means to produce a release of the brakes.

12. In a vehicle brake system, the combination with electroresponsive means for controlling applications and release of the brakes, of an inertia operated body and a manually movable body movable in parallel pathways, contacts carried by one of said bodies and operated upon relative movement between said bodies for controlling operation of said electroresponsive means, and means for moving said manually operated body at will different distances with respect to said inertia operated body.

13. In a vehicle brake system, the combination with electroresponsive means for controlling applications of the brakes, of a manually movable member, normally open contacts carried by said member for controlling said electroresponsive means, an inertia operated body, a cam on said body, means whereby movement of said manually movable member effects closing of said contacts by said cam, and means whereby subsequent movement of said inertia operated body effects opening of said contacts.

14. In a train braking system, in combination, brake means, electroresponsive means for controlling said brake means, a rotatable controller means rotatable backwards and forwards for controlling said electroresponsive means, a retardation controller device operated according to the rate of retardation of the vehicle, and means responsive to operation of said retardation controller device for controlling the rotation of said rotatable controller means.

15. In a train brake system, in combination, brake means, a switch device having movable contacts adapted to sequentially engage and disengage a plurality of stationary contacts, means responsive to sequential engagement of said movable contacts with said stationary contacts for progressively increasing the degree of application of said brake means and responsive to sequential disengagement with said stationary contacts for progressively decreasing the degree of brake application, a retardation controller device providing for variable settings thereof, means for varying the setting of said retardation controller at will, and means responsive to operation of said retardation controller device for controlling operation of said switch device.

16. In a train brake system, in combination, a brake cylinder, normally energized electroresponsive valve means operable when deenergized to effect a supply of fluid under pressure to the brake cylinder, a rotary contact device having a biased position in which said electroresponsive means is maintained energized and being operable to a position where said electroresponsive means is deenergized, a fluid pressure operated motor for controlling operation of said contact device, a retardation controller device operated according to the rate of retardation of the vehicle and providing for adjustment to operate similarly at different rates of retardation, and means for controlling operation of said fluid pressure motor according to operation of said retardation controller device.

17. In a vehicle brake system, in combination, a brake cylinder, electroresponsive valve means for controlling the supply of fluid under pressure to and its release from said brake cylinder, a plurality of circuits adapted to supply current to said electroresponsive valve means, a rotary switch device adapted when rotated to successively connect said circuits to a source of current supply, retardation control means for causing operation of said switch device according to a desired rate of retardation, and pressure operated relays associated with each of said circuits, said relays being responsive to brake cylinder pressure and being operable to open each of said circuits at a different brake cylinder pressure.

18. In a vehicle brake system, in combination, a brake cylinder, a retardation controller device having a manually movable body and an inertia operated body, a drum type controller device having a release position and being operable to different application positions, electroresponsive means rendered operable upon movement of said manually movable body for operating said controller device to application position, said electroresponsive means being also operable to effect operation of said control device toward release position responsive to movement of said inertia operated body, and means controlled by said drum controller device for controlling the supply of fluid under pressure to and its release from said brake cylinder.

19. In a vehicle brake system, in combination, brake means, a manually movable body, an inertia operated body, a control element, means for moving said manually movable body in accordance with movement of said control element, a first set of contacts carried by said manually movable body, a second set of stationary contacts, means providing for coaction between said inertia operated body and said manualy movable contacts in controlling service applications of the brakes and providing for coaction between said inertia operated body and said stationary contacts for controlling emergency application of the brakes, a relay operable when energized to render said manually movable contacts effective and operable when deenergized to render said stationary contacts effective, and means for controlling energization and deenergization of said relay.

20. In a retardation controller device for controlling the brakes of a railway vehicle, in combination, a movable member, contacts carried by said member, a control element, means for moving said movable member a degree in accordance with the degree of movement of said control element, and an inertia operated body for operating said contacts.

21. In a retardation controller device for controlling the brakes of a railway vehicle, in combination, a movable member, normally open contacts associated with said member, normally closed contacts associated with said member, an inertia operated body adapted to operate said contacts, a movable control element, and means for actuating said movable member a degree in accordance with the degree of movement of said control element.

22. In a retardation controller device for controlling the brakes of a railway vehicle, in combination, a movable member, contacts carried by said member, a control element, means for moving said movable member upon movement of said control element to effect one operation of said contacts, and an inertia operated body operable when moved with respect to said movable body for effecting another operation of said contacts.

23. In a retardation controller device, in combination, a slidably movable member, a plurality of contacts carried by said member, an inertia operated body, said inertia operated body and movable member having biased positions in which certain of said contacts are open and certain other of said contacts are closed, a control element, means for actuating said movable member a distance in accordance with the degree of movement of said control element, said movement of said movable member closing certain of said contacts and opening certain other of said contacts, and means whereby subsequent movement of said inertia operated body closes said opened contacts and opens said closed contacts.

24. In a retardation controller device, in combination, a slidably movable member, a plurality of contacts carried by said member, a rolling inertia operated body, means for normally urging said movable member and said inertia operated body to biased positions in which certain of said contacts are open and certain other of said contacts are closed, means providing for movement of said movable member relative to said inertia operated body, and means associated with said inertia operated body for effecting closing of said open contacts and opening of said closed contacts when said movable member is so moved and being operable upon subsequent movement of said inertia operated body to reverse this operation of the contacts.

25. In a retardation controller device, in combination, a slidably movable member, a plurality of contacts carried by said member, an inertia operated body, cams carried by said inertia operated body for operating said contacts, and means providing for movement of said movable member relative to said inertia operated body to one or more positions where said contacts are operated in one manner and providing for operation of said contacts in a different manner upon subsequent movement of said inertia operated body.

26. In a retardation controller device, in combination, a slidably movable member, normally open and normally closed contacts carried by said member, an inertia operated body, cams carried by said inertia operated body, means providing for movement of said movable member and said inertia operable body in parallel pathways, a control element, and means for actuating said movable member relative to said inertia operated body whereby said cams effect closing of said normally open contacts and opening of said normally closed contacts, said cams being adapted to close said opened contacts and open said closed contacts upon subsequent movement of said inertia operated body.

27. In a retardation controller device, in combination, a slidably movable member, a plurality of movable contacts carried by said member, an inertia operated body, a casing supporting said movable member and inertia operated body and providing for relative movement between said member and body, relatively stationary contacts carried by said casing, means for urging said movable member and inertia operated body to biased positions, cams carried by said inertia operated body for operating said movable contacts and said stationary contacts, a control element, means for actuating said movable member a distance in accordance with the degree of movement of said control element, said movement of said movable member causing said cams to close certain of said movable contacts and to open certain other of said movable contacts and subsequent movement of said inertia operated body causing said cams to reverse this operation of said movable contacts, said stationary contacts having a position such that operation thereof by said cams corresponds to operation of said movable contacts for the maximum degree of movement of said control element.

28. In a vehicle brake system, in combination, a brake cylinder, a rotary controller device, means for controlling the rate of rotation of said controller device, means responsive to rotation of said controller device for effecting a supply of fluid under pressure to the brake cylinder, and means for controlling the rate of rise of brake cylinder pressure according to the rate of rotation of said controller device.

29. In a vehicle brake system, in combination, a brake cylinder, a rotary controller device, means for controlling rotation of said controller device, means responsive to rotation of said controller device for effecting a supply of fluid under pressure to the brake cylinder, and Bourdon tubes responsive to brake cylinder pressure for controlling the rate of rise of brake cylinder pressure.

30. In a vehicle brake system, in combination, a brake cylinder, electroresponsive means for controlling the supply of fluid under pressure to the brake cylinder, a relay controlling energization of said electroresponsive means, a plurality of Bourdon tubes responsive to brake cylinder pressure for controlling energization of said relay, and a rotary switch device for selectively controlling the effectiveness of operation of said Bourdon tubes.

31. In a vehicle brake system, in combination, a brake cylinder, electroresponsive valve means for controlling the supply of fluid under pressure to the brake cylinder, a relay for controlling energization of said electroresponsive means, and a plurality of Bourdon tubes responsive to brake cylinder pressure for controlling energization of said relay.

32. In a vehicle brake system, in combination, brake means, a control circuit, a relay adapted to be energized when said circuit is closed and to be deenergized when said circuit is open, means rendered operative when said relay is energized for controlling service applications of said brake means, means rendered operative when said relay is deenergized to effect an emergency application of said brake means, contacts in said control circuit, a control element having a safety position, and means operative when said control element is in said safety position for holding said contacts closed and operable when said control element is moved from said safety position to open said contacts.

33. In a vehicle brake system, in combination, brake means, electropneumatic means operable to effect an application of said brake means, a first group of contacts adapted to be manually operated to effect operation of said electropneumatic means, a second group of contacts normally in operative position to effect operation of said electropneumatic means, a first group of circuits connecting said first group of contacts to said electropneumatic means, a second group of circuits connecting said second group of contacts to said electropneumatic means, a relay controlling both groups of circuits and operable to open one group of circuits while closing the other group of circuits, and safety means for controlling energization and deenergization of said relay.

34. In a vehicle brake system, in combination, brake means, a relay having an energized position and a deenergized position, means rendered operative when said relay is energized for manually controlling applications of said brake means, means rendered operative when said relay is deenergized to automatically effect an emergency application of said brake means, a circuit adapted to extend throughout the train for supplying current to said relay, safety means having contacts in said circuit, a by-pass circuit also adapted to supply current to said relay, and a push switch for controlling said by-pass circuit.

35. In a train brake system, in combination, brake means, a relay adapted to have an energized position and a deenergized position, means responsive to deenergization of said relay for effecting an emergency application of said brake means, a control circuit adapted to extend throughout the train for supplying current to maintain said relay energized, normally closed contacts in said circuit adapted to be opened at will, and normally open contacts in said circuit adapted to be held closed by an operator, said relay being adapted to be deenergized upon opening of either of said contacts.

36. In a vehicle brake system, in combination, a brake cylinder, a reservoir, electroresponsive valve means operable when energized to effect a supply of fluid under pressure from said reservoir to the brake cylinder, a relay for controlling energization and deenergization of said electroresponsive valve means, and a Bourdon tube responsive to the pressure of fluid in said reservoir for controlling energization of said relay.

37. In a railway train brake equipment, the combination with a plurality of braking equipments, each of said equipments including a brake cylinder, a valve device for controlling the supply of fluid under pressure to and its release from the brake cylinder, and electroresponsive means for controlling operation of said valve device; of a retardation controller device having movable and stationary sets of contacts for controlling operation of said electroresponsive means, said movable contacts being adapted to be moved according to a desired rate of retardation and operable thereafter to control said electroresponsive means to maintain the selected rate, and said stationary contacts being operable to control said electroresponsive means to maintain a maximum rate of retardation; and an electrical relay adapted when energized to render one of said sets of contacts effective in controlling said electroresponsive means and when deenergized to render the other of said sets effective.

38. In a vehicle brake system, in combination, a retardation controller device having two sets of contacts, one of said sets being manually adjustable to different positions to provide for any desired rate of retardation from zero to a maximum and the other of said sets being fixed to provide for a maximum rate of retardation, means for selecting one or the other of said sets of contacts, and brake control means controlled by the selected set of contacts.

39. In a vehicle braking system, a retardation controller device having two controlling elements, one of said elements being manually adjustable to provide for any desired rate of retardation from zero to a maximum and the other of said elements being fixed to provide for a maximum rate of retardation, means for selecting one or the other of said elements, and brake control means controlled by the selected element.

40. In a vehicle brake apparatus, the combination with a brake cylinder, of pressure operated means for controlling the supply of fluid under pressure to and its release from said brake cylinder, electroresponsive means for controlling fluid under pressure supplied to operate said first means, a control element, and means operable upon changes in the rate of speed of the vehicle for controlling said electroresponsive means, said last means providing for selecting speed changes at which said last means responds according to the degree or extent of movement of said control element.

41. In a vehicle brake apparatus, the combination with a brake cylinder, a reservoir and a valve device for controlling the flow of fluid under pressure from said reservoir to said brake cylinder, of electroresponsive means for controlling operation of said valve device, means operable upon a change in speed of the vehicle for controlling said electroresponsive means, and means including a manually operated control element for conditioning said last means to become operable to control said electroresponsive means at different rates of speed change according to the degree of movement of said element.

42. In a vehicle brake system, in combination, a brake cylinder, a first electroresponsive means for controlling a communication through which fluid under pressure is supplied to said brake cylinder, a second electroresponsive means for controlling a communication through which fluid under pressure is released from said brake cylinder, a member movable at will, a second member movable in a linear pathway according to the rate of retardation of the vehicle, means rendered operable upon movement of said first movable member for effecting operation of said second electroresponsive means to close said release communication and for effecting operation of said first electroresponsive means to open said supply communication, and means rendered operable upon subsequent movement of said second movable member for effecting operation of said first electroresponsive means to close said supply communication and operation of said second electroresponsive means to open said release communication.

43. In a vehicle brake system, in combination, a brake cylinder, an electroresponsive valve means for controlling a communication through which fluid under pressure is supplied to said brake cylinder, a member movable by manual operation, a second member movable in a linear pathway toward and away from said first member according to the rate of retardation of the vehicle, means responsive to movement of said manually operated member for effecting operation of said electroresponsive means to open said communication and responsive to subsequent movement of said second movable member for effecting operation of said electroresponsive means to close said communication.

JOHN W. LOGAN, Jr.